(12) United States Patent
Newton et al.

(10) Patent No.: US 11,558,441 B2
(45) Date of Patent: *Jan. 17, 2023

(54) INTEGRATED SYSTEM AND METHOD FOR EXECUTING A COMMUNAL MEDIA SYSTEM IN A STREAMING APPLICATION

(71) Applicant: Groopview, Inc, Philadelphia, PA (US)

(72) Inventors: Delmond Newton, Philadelphia, PA (US); Krishnan Rajam, Germantown, MD (US)

(73) Assignee: Groopview Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,886

(22) Filed: Apr. 5, 2021

(65) Prior Publication Data

US 2022/0159049 A1 May 19, 2022

Related U.S. Application Data

(63) Continuation-in-part of application No. 16/951,404, filed on Nov. 18, 2020, now Pat. No. 11,388,215.

(51) Int. Cl.
*H04L 29/06* (2006.01)
*H04N 21/43* (2011.01)
(Continued)

(52) U.S. Cl.
CPC .......... *H04L 65/611* (2022.05); *H04L 65/403* (2013.01); *H04L 65/612* (2022.05);
(Continued)

(58) Field of Classification Search
CPC . H04L 65/403; H04L 65/601; H04L 65/4076; H04L 65/4084; H04L 65/602;
(Continued)

(56) References Cited

U.S. PATENT DOCUMENTS 9,282,068 B1 * 3/2016 Pan .................. H04L 65/403
2010/0274858 A1 * 10/2010 Lindberg ............... G06F 9/452
715/838

(Continued)

*Primary Examiner* — Kostas J Katsikis
(74) *Attorney, Agent, or Firm* — Neal Blibo LLC; Arlene P. Neal

(57) ABSTRACT

A method for delivering multimedia content during a communal session at a media system commutatively coupled with a streaming application. The method includes receiving a request to initiate the communal session; retrieving contact information for user devices selected to participate in the communal session; retrieving an address for each of the user devices; receiving a source location for multimedia content selected in the streaming application; and sharing the source location with a player that is configured to transmit the multimedia content to each of the user devices. The method also includes, at an appointed time, initiating video playback for each of the user devices, synchronizing delivery of the multimedia content and social media content generated on each of the user devices, and exchanging playback control messages with the streaming application to direct the synchronized transmissions of the multimedia content and social media content to each of the user devices.

20 Claims, 13 Drawing Sheets

(51) Int. Cl.
   *H04N 21/4223*   (2011.01)
   *H04L 65/611*    (2022.01)
   *H04L 65/403*    (2022.01)
   *H04L 65/75*     (2022.01)
   *H04L 65/612*    (2022.01)

(52) U.S. Cl.
   CPC ......... *H04L 65/75* (2022.05); *H04N 21/4223* (2013.01); *H04N 21/4307* (2013.01)

(58) Field of Classification Search
   CPC ......... H04N 21/4307; H04N 21/43076; H04N 21/4223
   See application file for complete search history.

(56) References Cited

U.S. PATENT DOCUMENTS

| | | | |
|---|---|---|---|
| 2013/0170818 A1* | 7/2013 | Klappert | G06Q 50/01 386/299 |
| 2014/0362165 A1* | 12/2014 | Ackerman | H04N 7/152 348/14.07 |
| 2015/0134737 A1* | 5/2015 | Albrecht | H04L 51/52 709/204 |
| 2017/0273044 A1* | 9/2017 | Alsina | H04N 21/43637 |
| 2017/0331866 A1* | 11/2017 | Corbin | G06F 16/435 |
| 2019/0171341 A1* | 6/2019 | Eubanks | G06F 3/0484 |
| 2019/0200072 A1* | 6/2019 | Camargo | H04N 21/6547 |
| 2020/0112450 A1* | 4/2020 | Chhabra | G06Q 10/10 |
| 2021/0234909 A1* | 7/2021 | Shortt | H04N 21/2668 |
| 2021/0266621 A1* | 8/2021 | Marten | H04L 65/4084 |
| 2021/0352359 A1* | 11/2021 | Barvo | H04N 21/242 |

* cited by examiner (A)

580 — COMMUNAL MEDIA SYSTEM 100 OPENS A VIDEO CHAT SESSION FOR DEVICES 104A-104D AND SHOWS THE OPENED VIDEO CHAT SESSION ON STREAMING APPLICATION 402

590 — INTEGRATED SYSTEM 102D RECEIVES AND SHARES A SOURCE LOCATION FOR THE SELECTED CONTENT WITH A VIDEO PLAYER 404 THAT IS CONFIGURED TO TRANSMIT THE CONTENT TO EACH USER DEVICE 104A-104D

5100 — AT AN APPOINTED TIME, COMMUNAL MEDIA SYSTEM 100 INTIATES VIDEO PLAYBACK ON DEVICES 104A-104D AND SYNCHRONIZATION SYSTEM 102B SYNCHRONIZES CONTENT RETRIEVED FROM STREAMING APPLICATION AND SOCIAL MEDIA CONTENT GENERATED ON DEVICES 104A-104D DURING CONTENT DELIVERY TO DEVICES 104A-104D

5110 — SYNCHRONIZATION SYSTEM 102B EXCHANGES PLAYBACK CONTROL MESSAGES WITH STREAMING APPLICATION 402 DURING TRANSMISSION OF THE CONTENT TO DEVICES 104A-104D

5120 — WHEN THE COMMUNAL SESSION END, VIDEO PLAYER 404 SENDS AN INDICATION TO INTEGRATION SYSTEM 102D

5130 — COMMUNAL MEDIA SYSTEM 100 CLOSES THE VIDEO CHAT SESSION AND TRANSFERS CONTROL TO STREAMING APPLICATION 402

END

FIG. 5B

INTEGRATED SYSTEM AND METHOD FOR EXECUTING A COMMUNAL MEDIA SYSTEM IN A STREAMING APPLICATION

CROSS REFERENCE TO RELATED APPLICATION

The present application is a continuation-in-part of U.S. application Ser. No. 16/951,404 titled "A Multilayer and Synchronized Communal Social Media System and Method," filed Nov. 18, 2020, which claims the benefit of U.S. Provisional application Ser. No. 16/872,704 titled "A Communal Social Media System and Method," filed May 12, 2020, which claims the benefit of U.S. Provisional Application Ser. No. 62/925,212 titled "Method For Viewing Online Content," filed Mar. 23, 2019, which claims the benefit of U.S. Provisional Application Ser. No. 62/749,298 titled "Method For Viewing Online Content," filed Oct. 23, 2018, all of which are incorporated by reference herein in their entirety.

BACKGROUND OF THE INVENTION

Individuals connected through internet browsers such as Google Chrome and social media platforms, such as Facebook, Twitter, and Instagram may simultaneously participate in an event, even when these individuals are physically located in different locations. For example, individuals in different locations that are connected via Facebook may view an event such as a concert, movie, or sports match, stream a video, play a video game, or attend an education session at the same time, while also being able to communicate, for example via text, with each other over the social media platform.

Similarly, individuals in different locations may watch the same video or other multimedia content using a streaming application, such as Netflix, that is integrated with a video sharing application, for example, a Chrome tele-party extension. While streaming a video using, for example, Netflix tele-party, individuals participating in the streaming session may communicate with each other, for example, via sending text messages on the streaming platform. However, these streaming sessions are typically not fully synchronized due to the differences in the network configurations of the devices used in the streaming session. For example, when multiple individuals are simultaneously streaming a video, there are likely to be different lag times on when the video is received on each user's device due to the differences in the configuration of each user's device/network, for example, the bandwidth associated with each user's network. Current video sharing applications are typically limited to operating on select devices. For example, some video sharing applications can only operate on desktop computers and are not configured to operate on portable devices such as smart phones or tablets. Moreover, interactions over these video sharing applications are typically fragmented, wherein they may provide one or more of video streaming, video sharing, group video chat and group text as discrete features, such that one or more of these features may not be available during a streaming session. There is thus a need for an improved system and method of integrating video sharing applications with streaming application while allowing the streaming application to fully synchronize communal video streams being viewed on multiple devices and to synchronize the communal video streams with social media content being transmitted across devices during communal viewing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1A:
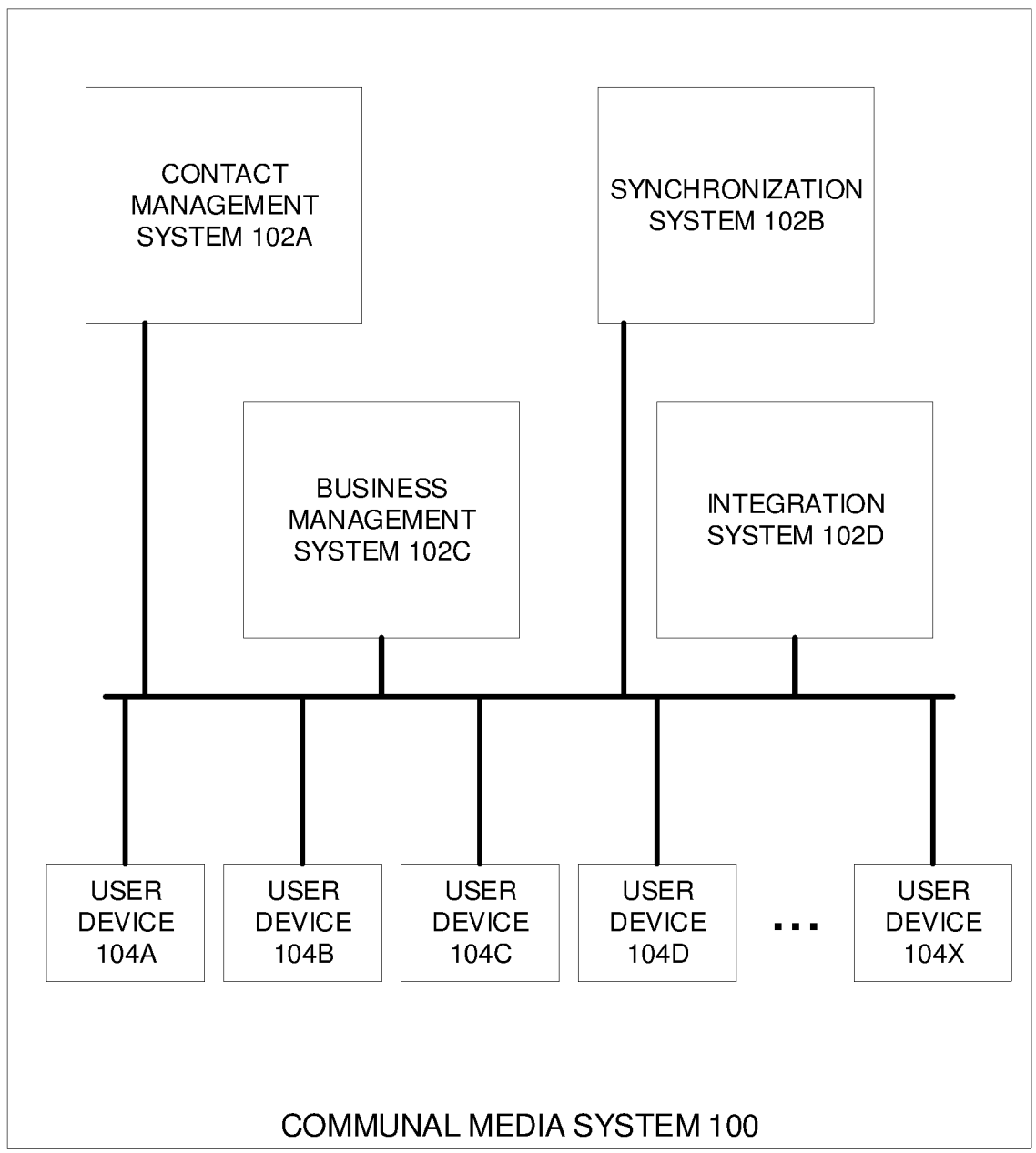
FIGS. 1A-1C are block diagrams of a communal media system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to a communal media system including a content management system configured to store multimedia content. The communal media system includes an integration system configured to integrate and communicatively couple the communal media system with a streaming application and to execute the communal media system within the streaming application. The integration system is also configured to retrieve contact information for a plurality of user devices selected to participate in a communal session from the streaming application, retrieve an address for each of the plurality of user devices from the streaming application, receive a source location for multimedia content selected in the streaming application, and share the source location with a player in the streaming application that is configured to transmit content to each of the plurality of user devices. The communal media system also includes a synchronization system configured to initiate video playback on the player for each of the plurality of user devices, synchronize delivery, to each of the plurality of user devices, of the multimedia content and social media content generated on each of the plurality of user devices, and exchange playback control messages with the streaming application to direct the synchronized transmissions of the multimedia content and social media content from the player to each of the plurality of user devices. The multimedia content and the social media content are delivered to each of the plurality of user devices at a same time, without any noticeable lag time during receipt of the multimedia content and the social media content by the plurality of user devices.

Some embodiments are directed to a method for delivering multimedia content during a communal session at a communal media system commutatively coupled with a streaming application. The method includes receiving a request to initiate the communal session from the streaming application; retrieving contact information for a plurality of user devices selected to participate in the communal session from the streaming application; retrieving an address for each of the plurality of user devices from the streaming application; receiving a source location for multimedia content selected in the streaming application; and sharing the source location with a player in the streaming application that is configured to transmit the multimedia content to each of the plurality of user devices. The method also includes, at an appointed time, initiating video playback on the player for each of the plurality of user devices, synchronizing the multimedia content and social media content generated on each of the plurality of user devices during delivery of the multimedia content and the social media content to each of the plurality of user devices, and exchanging playback control messages with the streaming application to direct the synchronized transmissions of the multimedia content and social media content from the player to each of the plurality of user devices.

Figure 1B:
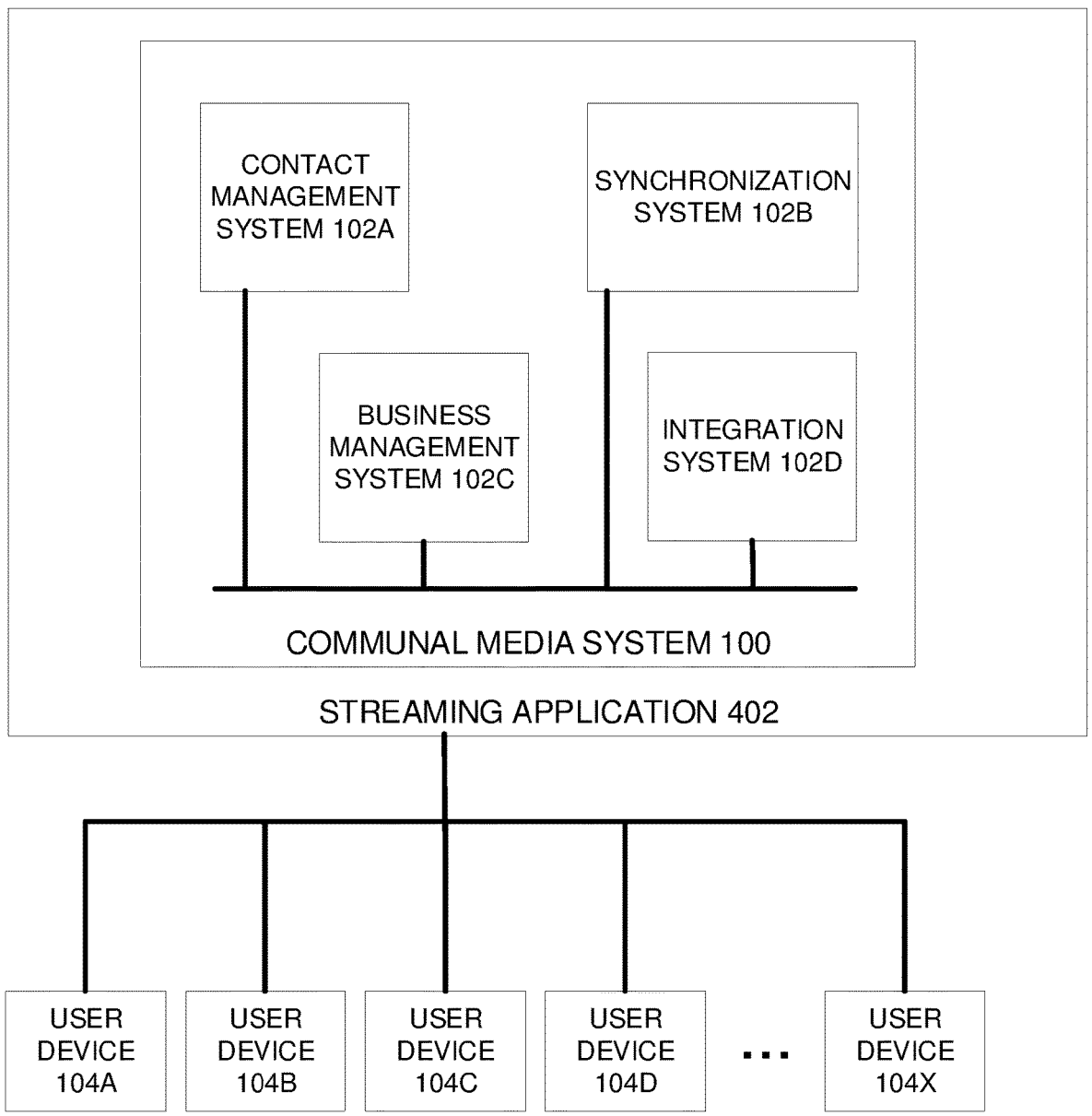
Figure 1C:
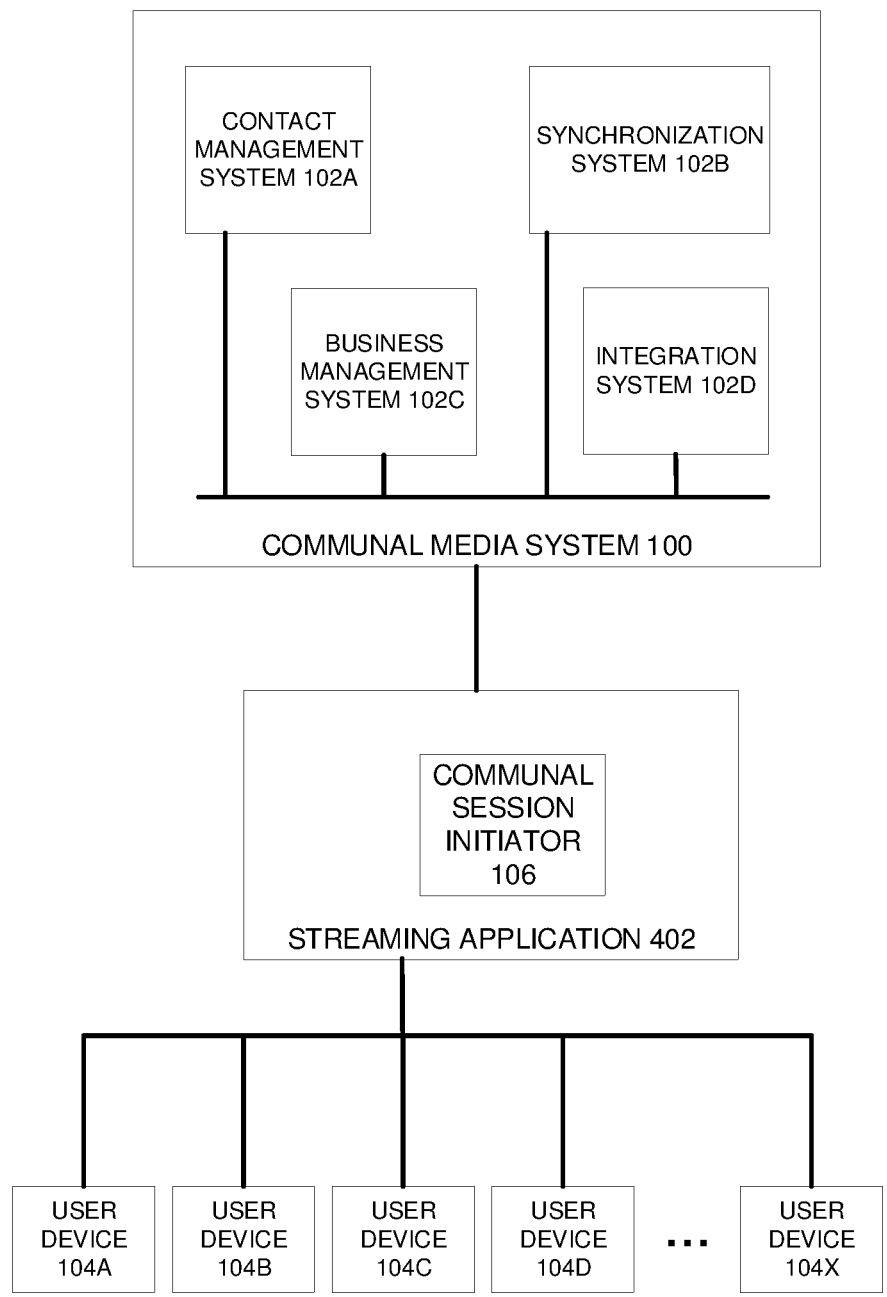

FIG. 1 is a block diagram of a communal media system used in accordance with some embodiments. Communal media system 100 is configured to integrate with a streaming application 402 (shown in further details in FIG. 4) to synchronize multimedia content being transmitted from streaming application 402 and simultaneously viewed on multiple devices during a communal session. Examples of streaming applications 402 may be, for example, Netflix, Hulu, Verizon Fios, or other streaming applications including multimedia content that can be streamed to user devices. The multimedia content may be live or recorded multimedia content. Communal media system 100 is configured to synchronize delivery of the multimedia content transmitted from streaming application 402 with social media content generated on the devices during the communal session.

Communal media system 100 is configured to include one or more systems 102 (shown as, for example, a contact management system 102a, a synchronization system 102b, a business management system 102c, and an integration system 102d), each of which may be in the same physical location as components on a single computing device or on different computing devices that are communicatively coupled. Systems 102 may also be in remote locations on different computing devices that are communicatively coupled. Systems 102 may include additional components (not shown for the sake of simplicity) that may be used to transmit information across communal media system 100.

Contact management system 102a is configured to manage invitations and notifications to user devices participating in a communal session. Synchronization system 102b is configured to synchronize delivery of information to user devices executing streaming application 402 during a communal session, such that each of the user devices in the communal session can receive the same information at the same time. Business management system 102c is configured to analyze operations on communal system 100. Integration system 102d is configured to integrate and communicatively couple communal media system 100 with a streaming application 402, such that messages generated on communal media system 100 can be transmitted to streaming application 402, and vice versa. When communal media system 100 is integrated with a streaming application, communal media system 100 may be executed within streaming application 402 and may operate as a component of streaming application 402, as shown in FIG.

Streaming application 402 is configured to communicate with multiple user devices 104 (shown as, for example, user devices 104a-104x) that are communicatively coupled to each other and with streaming application 402 and communal media system 100. User devices 104 may be stationary devices such as desktops, personal computers, or gaming devices; mobile devices such as mobile phones or tablets; or other computing devices that can be used for viewing multimedia content and interacting with social media applications. Each user device 104 may be independently configured. For example, user device 104a may be configured to operate on the iOS platform and on a 5G network having a first set of specifications, user device 104b may be configured to operate on the Android platform on a 5G network having a second set of specifications, user device 104c may be configured to operate on the iOS platform and on a 4G network having a first set of specifications, and user device 104d may be configured to operate on the iOS platform and on a 4G network having a third set of specifications, where the first, second and third specifications may be different. Despite the differences in the configurations of user devices 104, communal media system 100 is configured to synchronize simultaneous delivery of multimedia content transmitted from streaming application 402 and other social media content generated on user devices 104, such that each user device 104 receives the multimedia and social media content at the same time during a communal session.

At an initial period, each user device 104a-104x is configured to download and install streaming application 402 from, for example, a mobile app store or the Internet. After installing streaming application 402 on each user device 104, a user device (for example, device 104a) may log in to streaming application 402 to stream multimedia content from streaming application 402. After logging in, user device 104a is authenticated by streaming application 402. Once authenticated, user device 104a may select content from streaming application 402 and may then elect to participate in a communal session, wherein the selected content is streamed to user device 104a and to other user devices 104b-104x selected by user device 104a to participate in the communal session.

To initiate a communal session, host device 104a, i.e., the device that initiated the communal session after selecting content from streaming application 402, may select a communal session initiator 106 provided in streaming application 402. After selecting the communal session initiator 106, streaming application 402 initiates communal media system 100, wherein in cooperation with streaming application 402, communal media system 100 is configured to execute the communal session.

In the example where host device 104a selects the communal session initiator 106 to start a communal session, the user of device 104a may select participants for the communal session. For example, the user of device 104a may select the participants for the communal session by entering identifying information such as an email or phone number for each participant or by selecting the participants from a list provided by streaming application 402. If the user of device 104a selects users of devices 104b-104d as participants of the communal session, the content selected by device 104a may be shared/viewed on devices 104a-104d in a communal setting at an appointed time.

When communal media system 100 is initiated, contact management system 102a, via integration system 102d may retrieve the contact information, for example, the email or telephone number associated with devices 104b-104d from streaming application 402. Contact management system 102a may thereafter send invitations and notification, through integration system 102d, to devices 104b-104d for the users of devices 104a-104d to participate in the communal session at the appointed time. Integration system 102d may send the invitations directly to user devices 104b-104d or send the invitations via streaming application 402. Each of the users of devices 104b-104d may accept or reject the invitation. When the communal session is initiated and each of devices 104b-104d accepts the invitation, integration system 102d may obtain a first validation from streaming application 402 that each of users associated with devices 104a-104d is authenticated by streaming application 402 and can access the selected content.

If host device 104a selects a future time as the appointed time for the communal session such that the appointed time is later than an initiation period when the communal session was initiated, integration system 102d may obtain a second validation from streaming application 402 at the appointed time indicating that each of users associated with devices 104a-104d is still authenticated to view the selected content at that time. Once authenticated at the appointed time, integration system 102d may obtain an address of each user device 104a-104d running streaming application 402 and participating in the communal session. The address may be an internet protocol (IP) addresses, a device identifier, an email address, a telephone number or other information that uniquely identifies a device.

If the content selected by host device 104a is restricted content, at the appointed time, the user of each device 104a-104d may enter subscription information into the associated device 104a-104d, wherein each device may transmit the subscription information to contact management system 102a via streaming application 402. Using the received subscription information, contact management system 102a may obtain confirmation for access to the licensed content from a content owner or distributor. When necessary, contact management system 102a may provide access to subscriptions to one or more user devices 104a-104d and is configured to receive payments for the subscription from one or more user devices 104a-104d. Once the confirmation from the content owner or distributor for the user of each device 104a-104d is obtained, contact management system 102a may obtain decryption keys for the content from a digital rights management (DRM) system. Communal media system 100 may then present the decrypted information to user devices 104a-104d for communal viewing.

Prior to starting the communal session, synchronization system 102b is configured to capture system configuration information from each user device 104a-104b and determine if the configuration on the user device meets a predetermined threshold. For example, synchronization system 102b may determine if the bandwidth available for each user device 104a-104b is above a predetermined minimum bandwidth threshold. If synchronization system 102b determines that the bandwidth for a user device is below the predetermined minimum bandwidth threshold, synchronization system 102b may determine that the device with bandwidth below the minimum bandwidth threshold cannot be supported and will prevent the device from participating in the communal media session. If synchronization system 102b determines that the bandwidth of a user device 104 is at or above the predetermined threshold, synchronization system 102b may allow the user of that device to participate in the communal media session.

Consider, for example, that synchronization system 102b is configured evaluate the network/device configuration of each user device 104a-104b. Synchronization system 102b may obtain the device configuration, location, network carrier, and/or the network type (for example, WiFi, LTE, 5G) of each user device 104a-104d. Synchronization system 102b may also determine the minimum network bandwidth required for a communal session. For example, if synchronization system 102b determines that user device 104a has a bandwidth of 100 Mbps, user device 104b has a bandwidth of 75 Mbps, user device 104c has a bandwidth of 100 Mbps, and user device 104d has a bandwidth of 25 Mbps, synchronization system 102b may determine that the minimum network bandwidth on user devices 104-104d is 25 Mbps. If synchronization system 102b determines that the minimum required network bandwidth is below 25 Mbps, synchronization system 102b may determine that all of user devices 104-104d meet the network criteria for participating in communal media sessions. Synchronization system 102b may also test the speed of each user device 104a-104d and store the information for each user device 104a-104d along with a timestamp.

At the start of the communal session, integration system 102d is configured to request that each user device 104a-104d activates one or more cameras on the user device. When the cameras on devices 104a-104d are activated, integration system 102d is configured to initiate a video chat session, such that the video chat session is initiated and overlaid on top of the video rendered by the streaming application 402. Integration system 102d is further configured to receive the source location information for the content selected by host device 104a from streaming application 402 and to transmit the source location information to a video player 404 in streaming application 402, wherein video player 404 is configured to transmit the selected content to each user device 104a-104d. The source location information may be encrypted or non-encrypted information.

Synchronization system 102b is configured to initiate, via the video player 404, video playback on each user device 104a-104d and to synchronize the simultaneous delivery of multimedia content transmitted from video player 404 to user devices 104a-104d, such that each user device 104a-104d receives the delivered content at the same time with no noticeable delivery lag, as though each user device is a single device in the same location. Synchronization system 102b is also configured to synchronize the simultaneous delivery, via video player 404, of live videos captured from forward and/or rear cameras on one or more user device 104a-104d. The synchronized delivery is sent to those devices 104a-104d not creating the videos, such that each user device 104a-104d receives the delivered video at the same time it is being recorded with no noticeable delivery lag. Synchronization system 102b is further configured to simultaneously transmit, via video player 404, video chats, texts, emotive responses, and other social media content generated on one of the user devices to other user devices not creating the social media content, wherein the social media content is overlaid on the multimedia content.

Synchronization system 102b may ensure that the multimedia and social media content is synchronized on user devices 104a-104d by exchanging control messages with streaming application 402. As the media is played in devices 104a-104d, video player 404 may continuously send timestamp receipts and frame identifier acknowledgments of media fragment being played on each device 104a-104d to synchronization system 102b, wherein synchronization system 102b uses the timestamp receipts and frame identifier acknowledgments to synchronize delivery of content across devices 104a-104d.

When a communal session concludes, video player 404 transmits a completion message to integration system 102a. Communal media system 100 then closes the video chat session and transfers control to streaming application 402. Business management system 102c may then obtain and/or analyze data associated with the session.

In an embodiment, a user associated with a device 104a-104d may create a profile photo of the user, record an image of the user, or create an avatar that is configured to represent an image of the user, wherein the avatar may mimic the user's actions, including speaking and other actions performed by the user. The avatar or other images of users associated with devices 104a-104d, video chats, texts, emotive responses, and other social media features generated on devices 104a-104d may be overlaid on the delivered multimedia content during the communal session. This enables the users of devices 104a-104d to view the multimedia content and social media interactions at the same time, without any noticeable lag time associated with receipt of the multimedia and social media content at user devices 104a-104d. Other content such as targeted advertisement and recommendations based on previous usage on one or more user device 104a-104d may also be overlaid on the delivered multimedia content.

In an embodiment, the host device may pause, rewind, or fast forward the multimedia content, wherein synchronization system 102b is also configured to ensure that the pause, rewind, or fast forward action is synchronized across all user devices.

In an embodiment, the host may make the communal session live to the public by activating a live button on the user interface. Once the session is live, users of other devices, for example, devices 104e-104x that are accessing communal media system 100 may view and participate in the session by sending texts, emotive responses, and other social media features generated on those uses devices 104e-104x. The live session may have a ticker counter to identify how may users are participating in the live session.

In some embodiments, a thumbnail image of the selected content may be provided in communal media system 100. Users of devices 104a-104d may manipulate the thumbnail images by, for example, moving, resizing, or deleting the image on the user interface.

Figure 2:
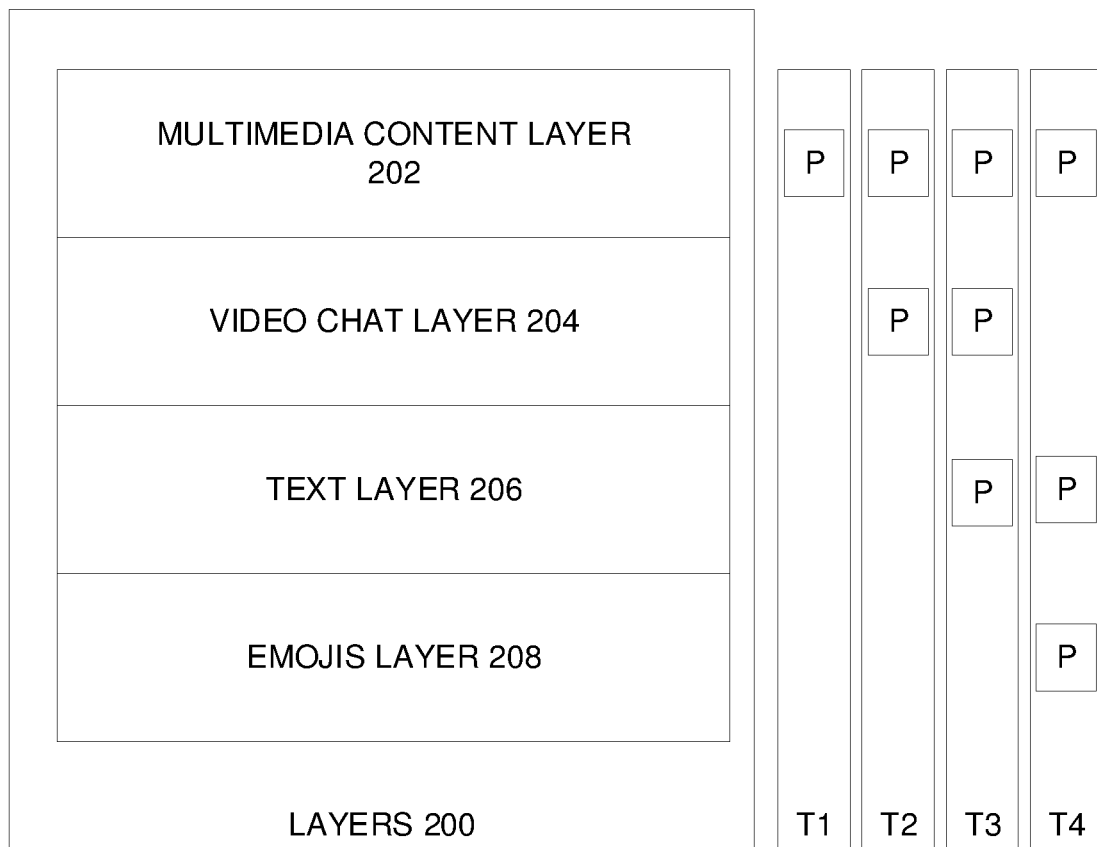
FIG. 2 is a block diagram of how packets are structured and delivered in the communal media system in accordance with some embodiments.

FIG. 2 is a block diagram of how packets are structured and delivered in the communal media system 100 in accordance with some embodiments. Synchronization system 102b is configured to separate content transmitted over communal media system 100 into multiple layers 200 and to synchronize delivery of the multiple layers to user devices 104a-104d, i.e., those user devices registered to participate in the session on communal media system 100. For example, synchronization system 102b may configure the multimedia content selected from streaming application 402 in a multimedia content layer 202, video chats received from user devices 104a-104d in a video chat layer 204, texts received from user devices 104a-104d in a text layer 206, and emojis received from user devices 104a-104d in an emojis layer 204. It should be apparent that synchronization system 102b may separate content transmitted over communal media system 100 into more or fewer layers than layers 202-208.

After separating the content into layers 200, synchronization system 102b may prioritize delivery of packets. For example, packets in multimedia content layer 202 may have a first priority, packets in video chat layer 204 may have a second priority, packets in text layer 206 may have a third priority, and packets in emojis layer 204 may have a fourth priority. Synchronization system 102b is also configured to synchronize voice and video packets in video streams in multimedia content layer 202 and voice and video packets in video chat layer 204 so that there is no lag time between the voice and the video packets in each layer. As such, synchronization system 102b is configured to synchronize delivery of packets in the same layer and delivery of multiple layers of content across disparate devices and disparate access networks so that all user devices 104a-104d may receive content delivered over communal media system 100 at the same time.

Consider, for example, that synchronization system 102b has packets (P) in different layers that are to be delivered at times T1-T4, as shown in FIG. 2. At T1, the packets in multimedia content layer 202 are delivered first. At T2, the packets in multimedia content layer 202 are delivered before the packets in video chat layer 204. At T3, the packets in multimedia content layer 202 are delivered first, the packets in video chat layer 204 are delivered second, and the packets in text layer 206 are delivered last. At T4, the packets in multimedia content layer 202 are delivered first, the packets in text layer 206 are delivered second, and the packets in emoji layer 208 are delivered last.

Figure 3:
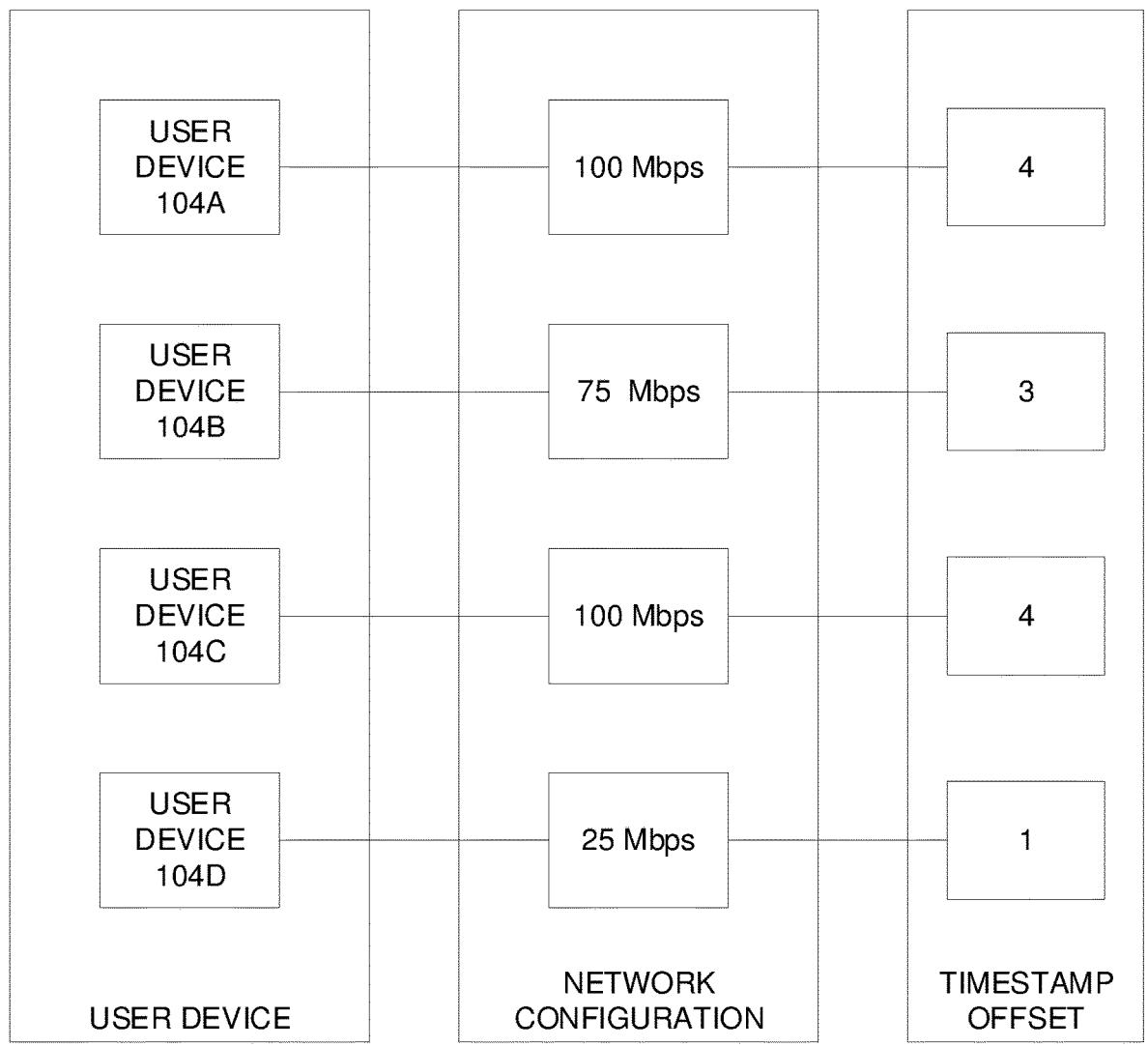
FIG. 3 is a block diagram of a timestamp structure used in accordance with some embodiments.

FIG. 3 is a block diagram of a timestamp structure used in accordance with some embodiments. When content is being transmitted over communal media system 100, at pre-determined time intervals during the session, synchronization system 102b is configured to continuously receive timestamp receipts from each user device 104a-104d. The timestamp receipts include timestamps of when a predefined number of packets is received by a user device. and timestamps of when a predefined number of packets is sent from the device. The interval for delivering and/or receiving timestamp receipts may be static or dynamic Static delivery may involve delivering and/or receiving timestamp receipts at predefined intervals (e.g., every 100 mms) and dynamic delivery may involve adapting delivery and/or receipt of timestamp receipts according to the various speeds of the heterogenous networks of user devices 104a-104d.

Synchronization system 102b may determine a timestamp offset for each user device 104a-104d and for each type/layer of content (video stream, video chat, text and emojis) delivered. In some embodiments, the timestamp offset may be based on a predetermined minimum network configuration and/or the timestamp receipts, wherein synchronization system 102b may adjust packet deliveries to correspond with the timestamp offset of each user device 104a-104d. Continuing with the example where user device 104*a* has a bandwidth of 100 Mbps, user device 104*a* has a bandwidth of 75 Mbps, user device 104*a* has a bandwidth of 100 Mbps, and user device 104*a* has a bandwidth of 25 Mbps, synchronization system 102*b* may set the timestamp offset for user devices 104*a*-104*d* based on the lowest bandwidth, as shown in FIG. 3. Accordingly, the timestamp offsets for user device 104*a* and 104*c* are set to four times the timestamp offset of user device 104*d* and the timestamp offset for user device 104*b* is set to three times the timestamp offset of user device 104*d*, This ensures that when packets are delivered using the timestamp offsets, synchronization system 102*b* can normalize the delivery of packets to all user devices 104*a*-104*d* (i.e., take care of propagation delays or speed up delivery based on the bandwidth). In this manner, all user devices 104*a*-104*d* will receive multimedia and social media contents at the same time and without any noticeable delay in receipt of the content among the devices, ensuring that users of devices 104*a*-104*d* are viewing and interacting with the content as if they were in the same physical location and viewing the content on the same device.

In addition to sending and receiving timestamp receipts to and from devices 104*a*-104*d*, synchronization system 102*b* may also send and/or receive information associated with frame and/or fragment of the multimedia content to devices 104*a*-104*d*. Continuing with the example above, before the viewing session begins, integration system 102*c* may request, from streaming application 402, a location of a manifest file including multimedia content for a communal viewing session. Streaming application 402 may provide information including, for example, a Uniform Resource Locator (URL) and/or the name of the manifest file. Media fragments of, for example, three to six seconds of the multimedia content, may be stored in the manifest file. Based on resolution, each second of the media fragment may include, for example, twenty-four to sixty frames of full motion video and each frame may include a unique frame identifier. Before the communal session, synchronization system 102*b* may send the URL for the manifest file, via streaming application 402, to user devices 104*a*-104*d* participating in the communal session.

In addition to and/or in lieu of timestamp receipts transmitted to and from devices 104*a*-104*d*, synchronization system 102*b* may use the frame identifiers in the media fragments transmitted to and from devices 104*a*-104*d* to synchronize delivery of the media to devices 104*a*-104*d*. Consider, for example, that during the viewing session synchronization system 102*b* is to transmit a fragment with twenty-four frames, with each successive frame assigned an identifier from 1-24. Also consider that at time T1, synchronization system 102*b* is to transmit frames 1-10 to devices 104*a*-104*d*, and at time T2, synchronization system 102*b* is to transmit frames 11-20 to devices 104*a*-104*d*. Between T1 and T2 synchronization system 102*b* may receive frame identifier acknowledgements of the receipts of frames 1-10 from devices 104*a*-104*d*. If synchronization system 102*b* receives a frame identifier acknowledgement of the receipt of frames 1-10 from devices 104*a*-104*b*, and a frame identifier acknowledgement of the receipt of frames 1-7 from device 104*c*, and a frame identifier acknowledgement of the receipt of frames 1-8 from devices 104*d*, at T2, rather than send frames 8-10 to device 104*c* and frames 9 and 10 to device 104*d*, synchronization system 102*b* may transmit frames 11-20 to devices 104*a*-104*d*, thereby synchronizing delivery of the frames to devices 104*a*-104*b* with delivery of the frames to devices 104*c*-104*d*.

In addition to performing configurations tests, including a speed test, on each user device 104*a*-104*d* to determine that the configuration of user device meets the minimum network threshold at the start of a session, synchronization system 102*b* may perform periodic speed tests (for example, on an as needed basis or at predefined intervals) on each user device 104*a*-104*d*.

At the start of the communal session, video player 404 may start to play the media fragments stored in the manifest file for host device 104*a* in an order determined, for example, by information obtained from the manifest file. At the start of the communal session in host device 104*a*, the video player may record a timestamp receipt for the start time, for example, in milliseconds or seconds, and may send the timestamp receipt and the frame number of the media fragment being played to synchronization system 102*b*. As the media is played in host device 104*a*, the video player may continuously send timestamp receipts and/or frame identifier acknowledgments of media fragment being played to synchronization system 102*b*. Synchronization system 102*b* may record the frame identifier acknowledgments, timestamp receipts, and/or the timestamp offset of host device 104*a*.

At the start of the communal session, video player 404 may also receive the start time for playing the media in user devices 104*b*-104*d* from synchronization system 102*b*. When the media playback starts, video player 404 may provide, to synchronization system 102*b*, a timestamp receipt of the start time of the media playback on each user device 104*b*-104*d* and the frame identifier acknowledgment of the media fragment(s) received by each user device 104*b*-104*d*. During the communal session, video player 404 may also provide the progress of the media playback on a predetermined basis for each user device 104*b*-104*d* to synchronization system 102*b*. Synchronization system 102*b* may review and compare the locations in the media being played on user devices 104*a*-104*d* on a pre-determined basis. Synchronization system 102*b* may continuously determine that the media being played on user devices 104*a*-104*d* are synchronized within a pre-determined period, for example, a pre-determined number of milliseconds or second. Synchronization system 102*b* may ensure that the media is synchronized on user devices 104*a*-104*d* by exchanging control messages with streaming application 402. Synchronization system 102*b* may dynamically adjust the pre-determined period to ensure the quality of the multimedia content. Synchronization system 102*b* may also ensure that the media being played on user devices 104*b*-104*d* is not ahead of the media being played on host device 104*a*.

Video player 404 may continuously send timestamp receipts and/or the frame identifier acknowledgments for fragment(s) played on each user device 104*a*-104*d* to synchronization system 102*b*. If the media being played on any of user devices 104*a*-104*d* falls behind a certain threshold, synchronization system 102*b* may provide signaling messages to streaming application 402. Synchronization system 102*b* may make necessary adjustments in transmitting the media to user devices 104*a*-104*d*, for example, either by instructing video player 404 to marginally slow the media being played to one or more devices or by accelerate the media being played to one or more devices, until all the devices are on the same frame. By making the necessary adjustments in transmitting the media to user devices 104*a*-104*d*, synchronization system 102*b* may ensure that the media is transmitted and played on all devices within acceptable tolerances.

If host device 104a rewinds the media being played on device 104a, the time offset associated with host device 104a and/or frame number associated with the content is adjusted continuously until host device 104a stops rewinding the media and playing the media resumes. Similarly, if host device 104a fast forwards the media being played on device 104a, the time offset and/or frame number is adjusted continuously until device 104a stops fast forwarding the media and playing the media resumes. The rewind or fast forward offset is sent to synchronization system 102b for adjustments of the transmissions on the other devices 104b-104d in the communal session. If host device 104a pauses the media being played on device 104a, a message is sent to synchronization system 102b and transmissions of the media is paused, such that a pause action on device 104a pauses playing of the media on all user devices 104b-104d at the same time.

Figure 4A:
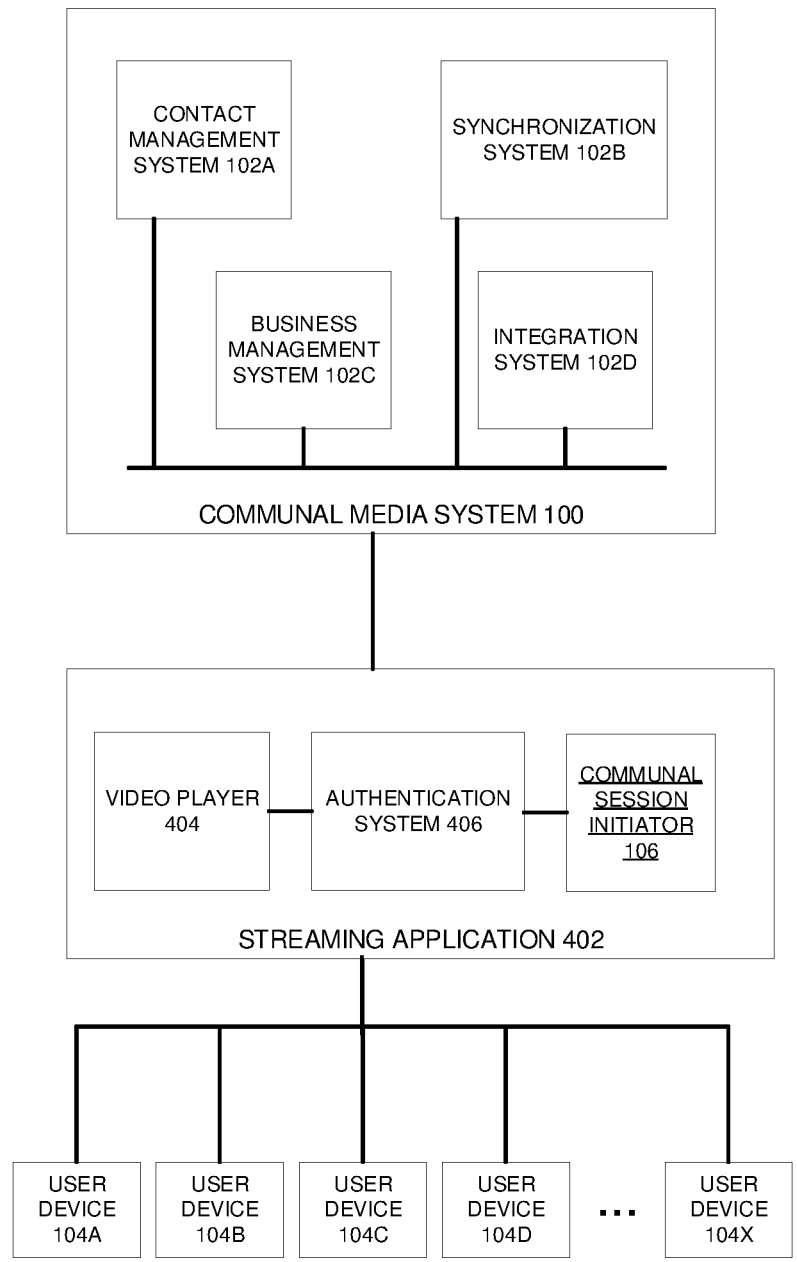
FIG. 4A is a block diagram of an overall system including a streaming application and a communal media system in accordance with some embodiments.

FIG. 4A is an overall block diagram of the communal media system integrated with a streaming application in accordance with some embodiments. Streaming application 402 is configured to communicate with multiple user devices 104 (shown as, for example, user devices 104a-104x) that are communicatively coupled to each other and with streaming application 402 and communal media system 100. Streaming application 402 may include communal session initiator 106, one or more video players 404, each of which is configured to stream content transmitted from streaming application 402 to a user device 104. Streaming application 402 may also include one or more authentication systems 406, each of which is configured to authenticate users of devices 104 and/or determine whether a user is entitled to access specific content.

Figure 4B:
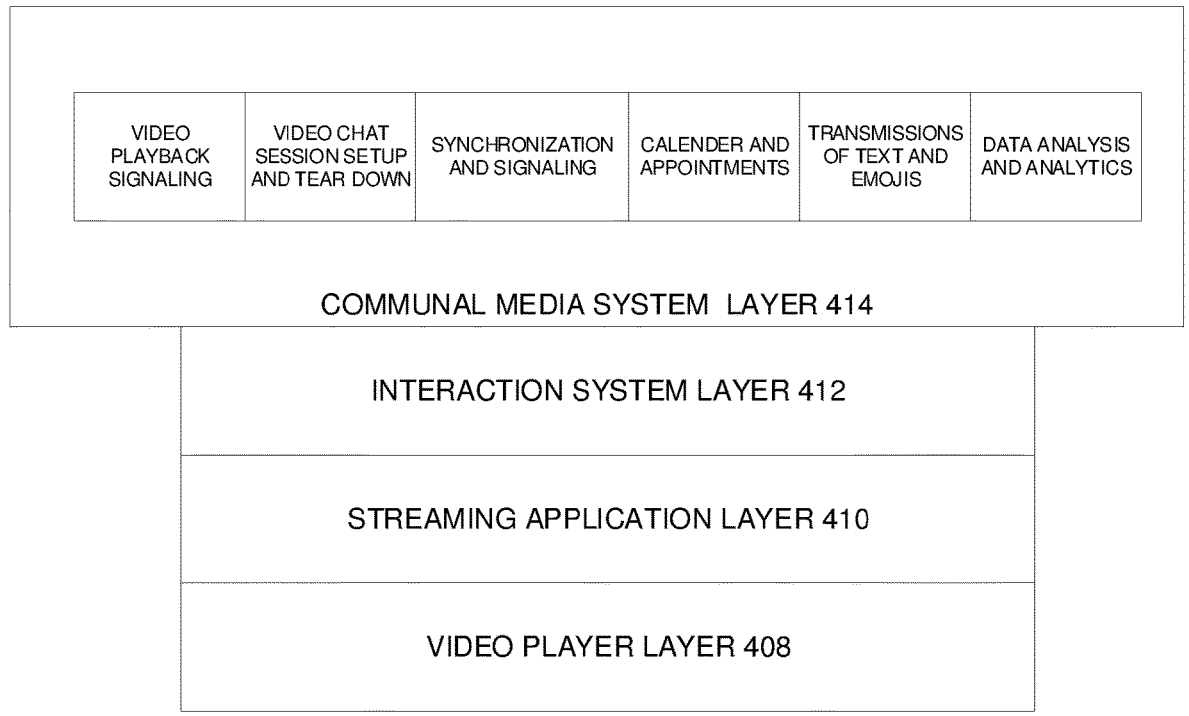
FIG. 4B is a block diagram layers in the overall system in accordance with some embodiments.

FIG. 4B is an overall block diagram of the layers of the overall system in accordance with some embodiments. At video player layer 408, video player 404 is configured to transmit information to and receive information from multiple user devices 104 (for example, user devices 104a-104x) that are communicatively coupled to each other and with streaming application 402 and communal media system 100. At streaming application layer 410, streaming application 402 is configured to communicate with video player 404 and interaction system 102d to exchange information transmitted between video player 404 and interaction system 102d. At interaction system layer 412, interaction system 102d is configured to communicate with streaming application 402 and with other components of communal media system 100 to exchange information transmitted between streaming application 402 and with the other components of communal media system 100. At communal media system layer 414, the other components of communal media system 100 may execute functions including, for example, video playback signaling, video chat session set up and tear down, synchronization and signaling, notifications, calendar and appointments, transmissions of texts and emojis, and data analysis and analytics. Functions executed at layer 414 may be transmitted to the user devices via layers 412, 410, 408 and information sent from user devices to communal media system 100 may be sent in the reverse order.

Figure 5A:
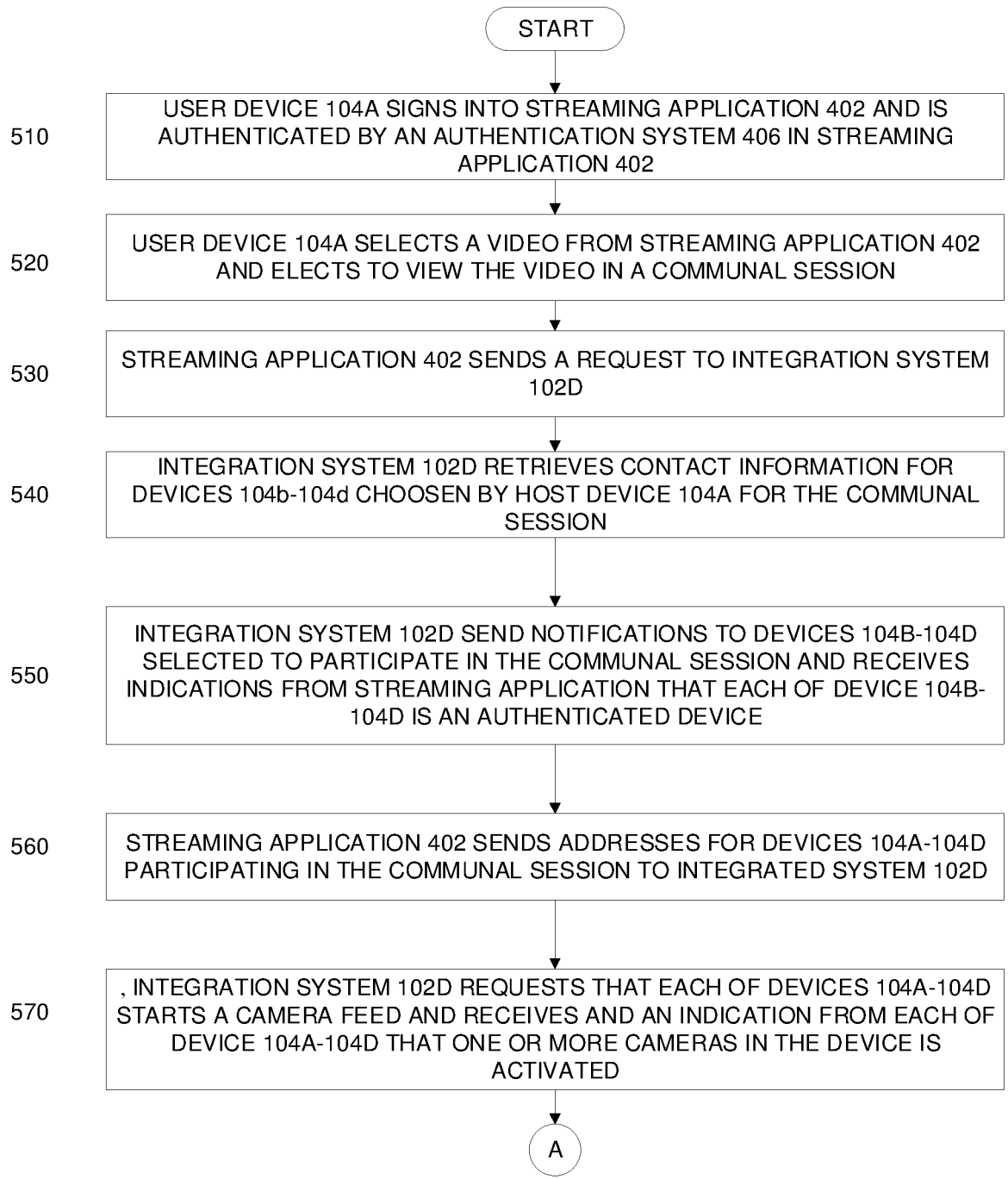
FIG. 5 is a flowchart of a method of interaction between streaming application 402 and communal media system 100 in accordance with some embodiments.

FIG. 5 is a flowchart of a method of interaction between streaming application 402 and communal media system 100 in accordance with some embodiments. At 510, user device 104a signs into streaming application 402 and is authenticated by an authentication system 406 in streaming application 402. At 520, user device 104a selects a video from streaming application 402 and elects to view the video in a communal session. At 530, streaming application 402 sends a request for the communal session to integration system 102d. At 540, integration system 102d retrieves contact information for devices 104b-104d chosen by host device 104a.

At 550, integration system 102d sends notifications to devices 104b-104d and receives indications from stream service application 402 that each of device 104b-104d is an authenticated device. At 560, streaming application 402 send addresses for devices 104a-104d to integration system 102d. At 570, integration system 102d requests that each of devices 104a-104d starts a camera feed and receives and an indication from each of device 104a-104d that one or more cameras in the device is activated.

At 580, communal media system 100 opens a video chat session for devices 104a-104d and shows the opened video chat session on streaming application 402. At 590, integration system 102d receives and shares a source location for the selected content with video player 404 that is configured to transmit content to each device 104a-104d. At 5100, at an appointed time, communal media system 100 initiates video playback on devices 104a-104d and synchronization system 102b synchronizes the content retrieved from streaming services application 402 and social media content generated on devices 104-104d during content delivery to devices 104a-104d. At 5110, during the communal session, synchronization system 10b exchanges playback control messages with streaming application 402 during transmission of the content to devices 104a-104d.

At 5120, when the communal session ends, video player 404 sends an indication to integration system 102d. At 5130, communal media system 100 closes the video chat session and transfers control to streaming application 402.

Figure 6:
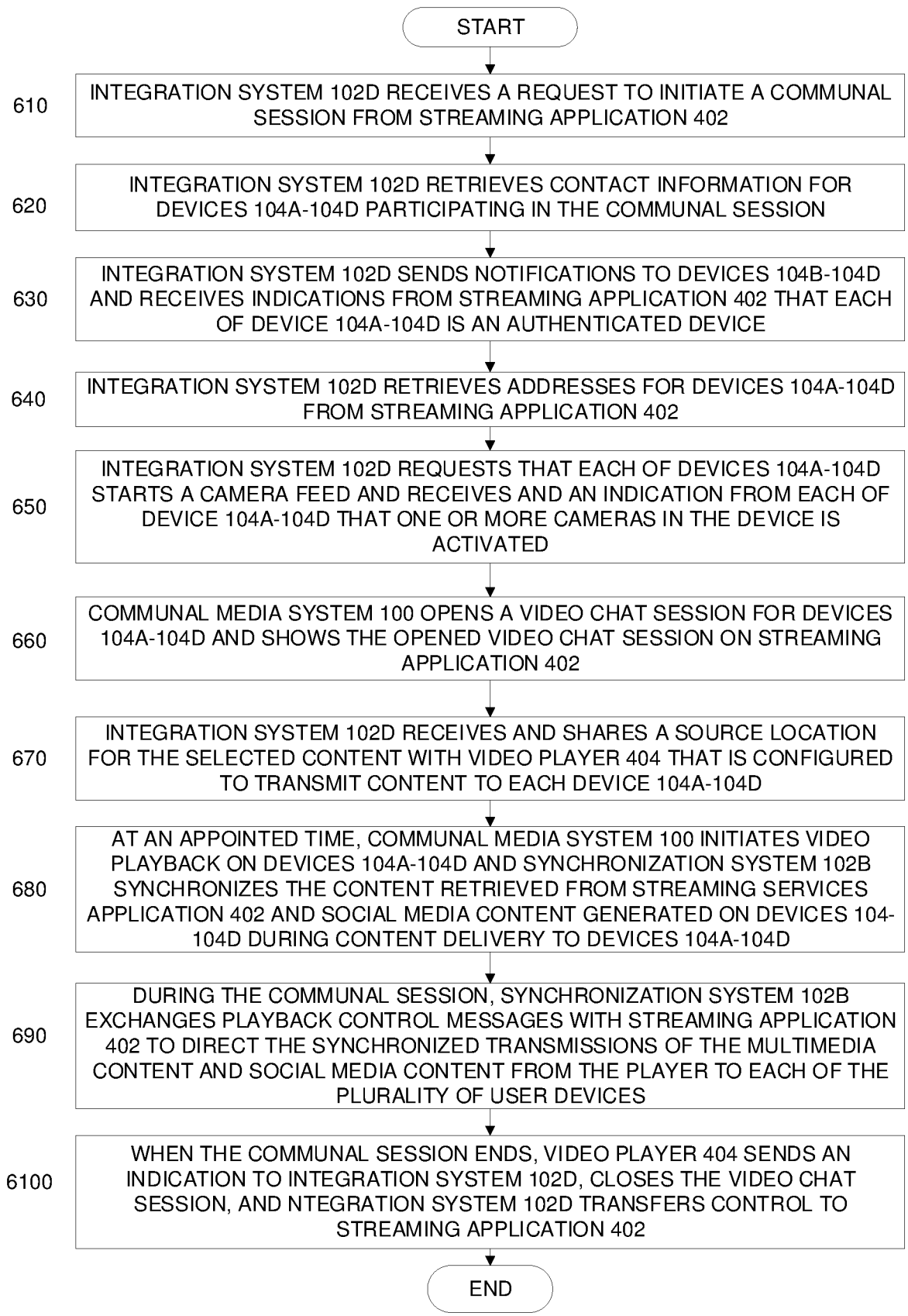
FIG. 6 is a flowchart of a method of sharing multimedia content in a streaming application in accordance with some embodiments.

FIG. 6 is a flowchart of a method of sharing multimedia content in a streaming application in accordance with some embodiments. At 610, integration system 102d receives a request to initiate a communal session from streaming application 402. At 620, integration system 102d retrieves contact information for devices 104a-104d participating in the communal session.

At 630, integration system 102d sends notifications to devices 104b-104d and receives indications from streaming application 402 that each of device 104a-104d is an authenticated device. At 640, integration system 102d retrieves addresses for devices 104a-104d from streaming application 402. At 650, integration system 102d requests that each of devices 104a-104d starts a camera feed and receives and an indication from each of device 104a-104d that one or more cameras in the device is activated.

At 660, communal media system 100 opens a video chat session for devices 104a-104d and shows the opened video chat session on streaming application 402. At 670, integration system 102d receives and shares a source location for the selected content with video player 404 that is configured to transmit content to each device 104a-104d. At 680, at an appointed time, communal media system 100 initiates video playback on devices 104a-104d and synchronization system 102b synchronizes the content retrieved from streaming services application 402 and social media content generated on devices 104-104d during content delivery to devices 104a-104d. At 690, during the communal session, synchronization system 102b exchanges playback control messages with streaming application 402 to direct the synchronized transmissions of the multimedia content and social media content from the player to each of the plurality of user devices.

At 6100, when the communal session ends, video player 404 sends an indication to integration system 102d, closes the video chat session, and integration system 102*d* transfers control to streaming application 402.

Figure 7:
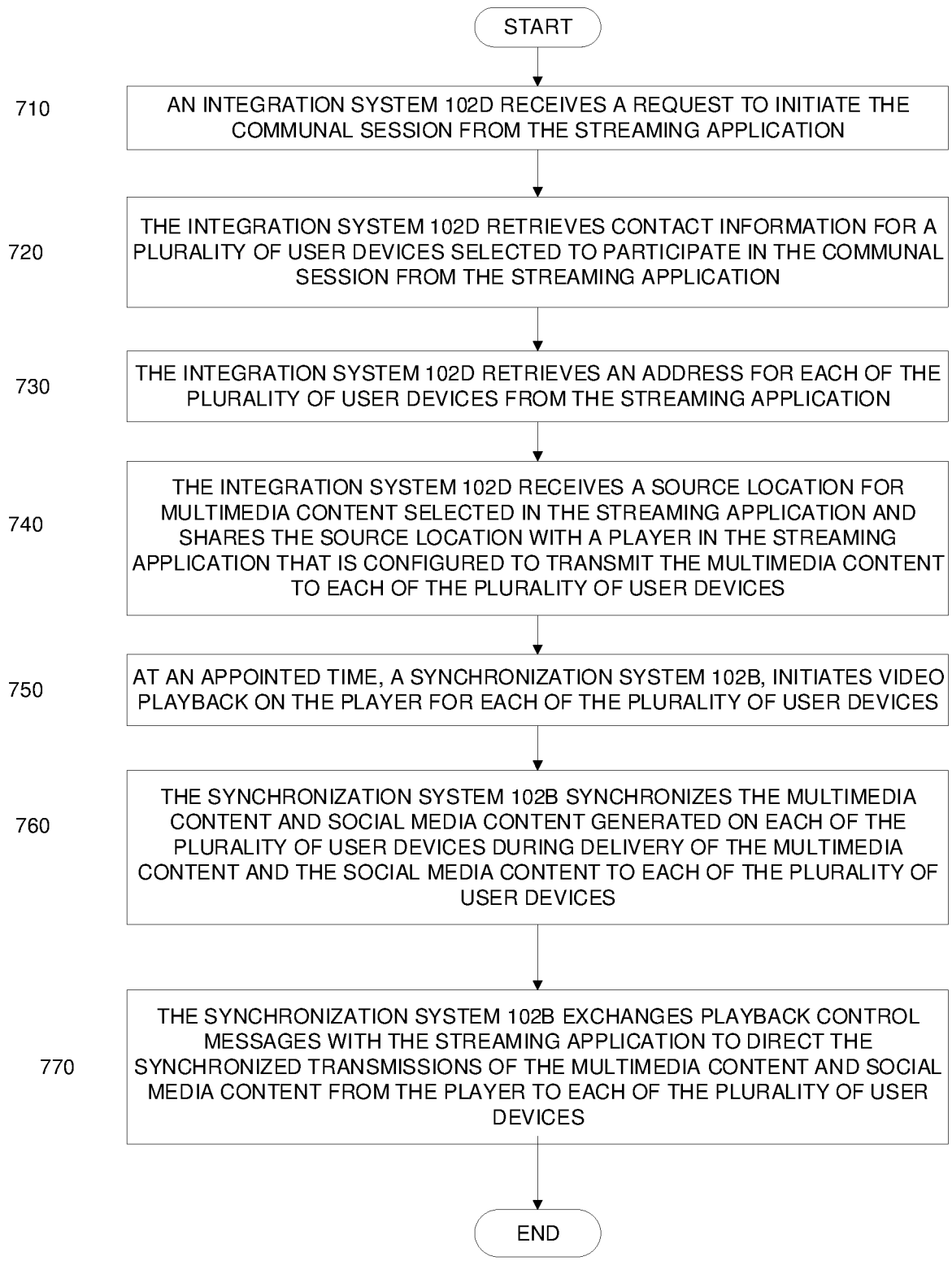
FIG. 7 is another flowchart of a method of sharing multimedia content in the streaming application in accordance with some embodiments.

FIG. 7 is a flowchart of a method for delivering multimedia content during a communal session at a communal media system commutatively coupled with a streaming application. At 710, an integration system 102*d* receives a request to initiate the communal session from the streaming application. At 720, the integration system 102*d* retrieves contact information for a plurality of user devices selected to participate in the communal session from the streaming application. At 730, the integration system 102*d* retrieves an address for each of the plurality of user devices from the streaming application. At 740, the integration system 102*d* receives a source location for multimedia content selected in the streaming application and shares the source location with a player in the streaming application that is configured to transmit the multimedia content to each of the plurality of user devices. At 750, at an appointed time, a synchronization system 102*b*, initiates video playback on the player for each of the plurality of user devices. At 760, the synchronization system 102*b* synchronizes the multimedia content and social media content generated on each of the plurality of user devices during delivery of the multimedia content and the social media content to each of the plurality of user devices. At 770, the synchronization system 102*b* exchanges playback control messages with the streaming application to direct the synchronized transmissions of the multimedia content and social media content from the player to each of the plurality of user devices.

Figure 8:
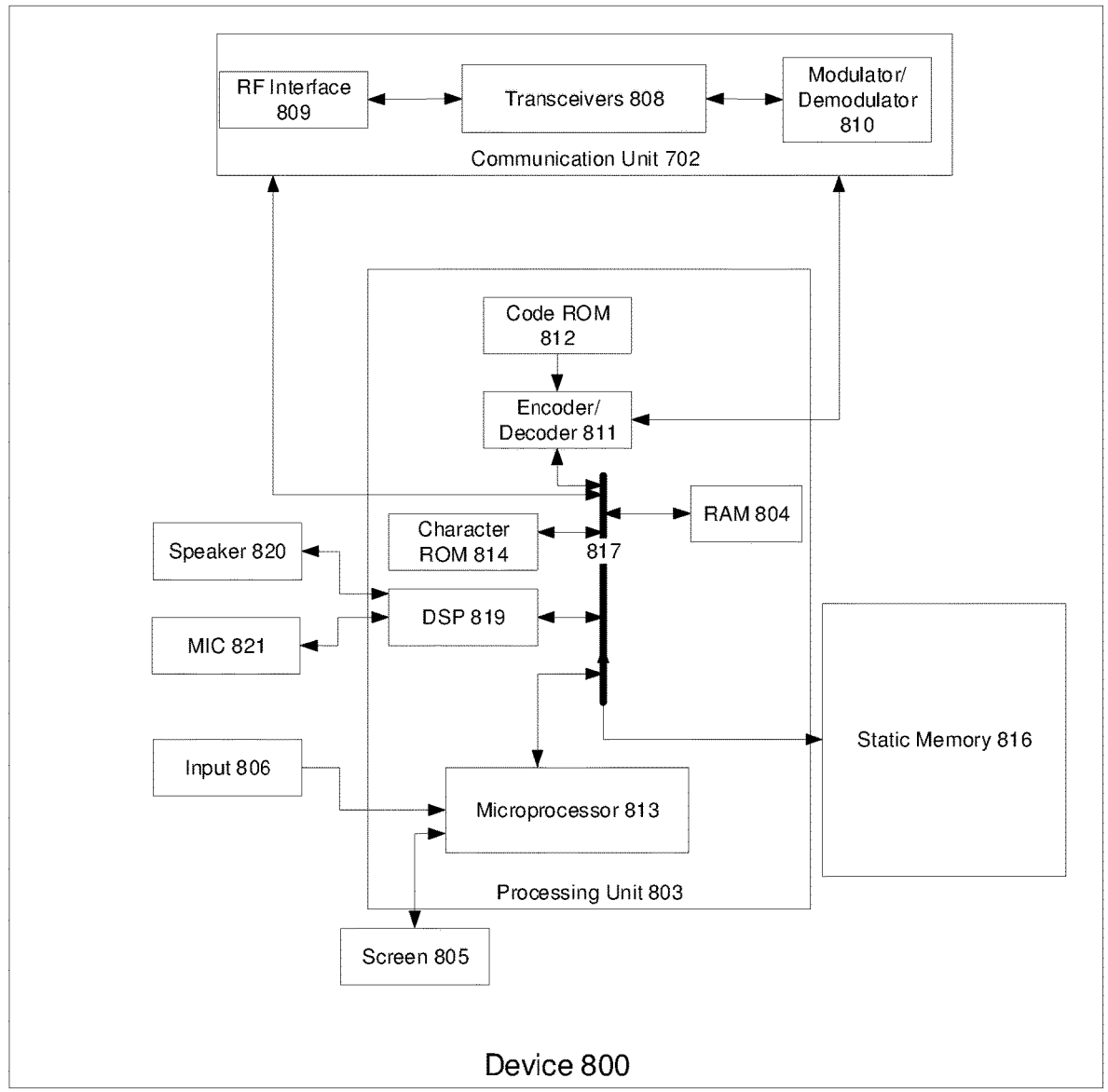
FIG. 8 is a block diagram of a user device used in accordance with some embodiments.

FIG. 8 is a block diagram of a user device 800, such as user device 104 of FIG. 1, used in accordance with some embodiments. User device 800 may include a communications unit 802 coupled to a common data and address bus 817 of a processor 803. Device 800 may also include an input unit (e.g., keypad, pointing device, etc.) 806, an output transducer unit (e.g., speaker) 820, an input transducer unit (e.g., a microphone) (MIC) 821, and a display screen 805, each coupled to be in communication with the processor 803.

The processor 803 may include, that is, implement, an encoder/decoder 811 with an associated code read-only memory (ROM) 812 for storing data for encoding and decoding voice, data, control, or other signals that may be transmitted or received by device 800. The processor 803 may further include one or more of a microprocessor 813 and digital signal processor (DSP) 819 coupled, by the common data and address bus 817, to the encoder/decoder 811 and to one or more memory devices, such as a ROM 814, a random access memory (RAM) 804, and a static or flash memory 816. One or more of ROM 814, RAM 804 and flash memory 816 may be included as part of processor 803 or may be separate from, and coupled to, the processor 803. The encoder/decoder 811 may be implemented by microprocessor 813 or DSP 819, or may be implemented by a separate component of the processor 803 and coupled to other components of the processor 803 via bus 818.

Communications unit 802 may include an RF interface 809 configurable to communicate with network components, and other user equipment within its communication range. Communications unit 802 may include one or more broadband and/or narrowband transceivers 808, such as a Long-Term Evolution (LTE) or 5G transceiver, a WiMAX transceiver perhaps operating in accordance with an IEEE 802.16 standard, and/or other similar type of wireless transceiver configurable to communicate via a wireless network for infrastructure communications. Communications unit 802 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 810 that is coupled to the encoder/decoder 811.

The one or more memory devices 814, 816 may store code for decoding or encoding data such as control, request, or instruction messages, channel change messages, and/or data or voice messages that may be transmitted or received by device 800 and other programs and instructions that, when executed by the processor 803, provide for device 800 to perform the functions and operations described herein.

Figure 9:
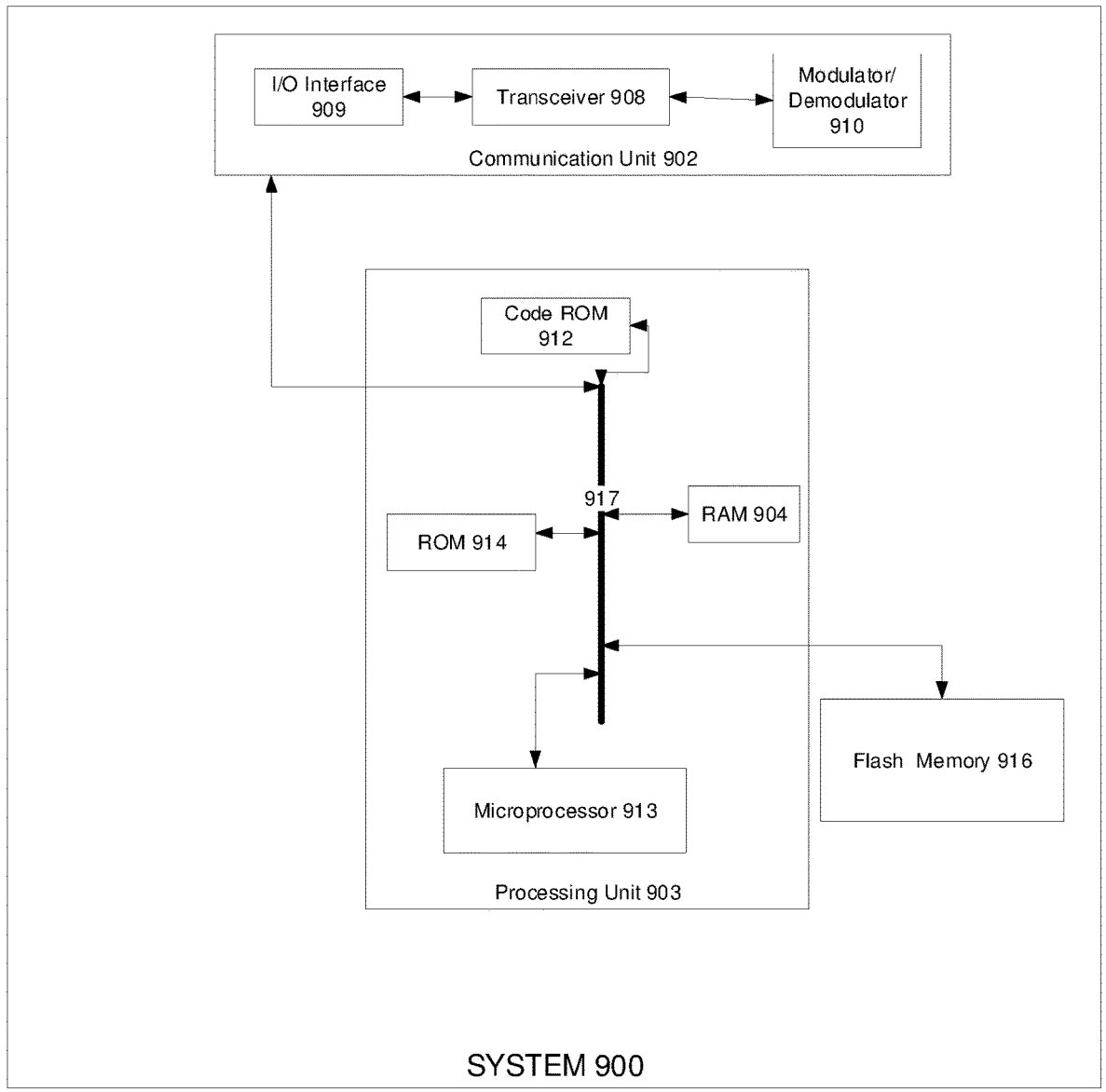
FIG. 9 is a block diagram of a system used in accordance with some embodiments.

FIG. 9 is a block diagram of a system 900, such as system 100 of FIG. 1, used in accordance with some embodiments. System 900, for example, may include a communications unit 902 coupled to a common data and address bus 917 of a processor 903. The processor 903 may include a code read-only memory (ROM) 912 for storing data for initializing system components of system 900. The processor 903 may further include a microprocessor 913 coupled, by the common data and address bus 917, to one or more memory devices, such as a read-only memory (ROM) 914, a random-access memory (RAM) 904, and/or a static or flash memory 916. One or more of ROM 914, RAM 904 and flash memory 916 may be included as part of processor 903 or may be separate from, and coupled to, the processor 903.

Communications unit 902 may include a wired or wireless input/output I/O interface 909 configurable to communicate with network components and other user equipment within its communication range. Communications unit 902 may include one or more broadband and/or narrowband transceivers 908, such as a Long-Term Evolution (LTE) transceiver and/or other similar type of wireless transceiver configurable to communicate via a wireless network for infrastructure communications. Communications unit 902 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 910. The one or more memory devices 912, 914 and 916 are configured to store non-transitory computer-executable instructions to perform a set of functions such as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communal media system, comprising:
an integration system including a processor to integrate and communicatively couple the communal media system with a streaming application, wherein a communal session initiator included within the streaming application executes the communal media system within the streaming application, wherein the integration system is configured to:
retrieve contact information for a plurality of user devices selected to participate in a communal session from the streaming application,
retrieve an address for each of the plurality of user devices from the streaming application, and
receive a source location for multimedia content selected in the streaming application and share the source location with a player in the streaming application that is configured to transmit content to each of the plurality of user devices; and
a synchronization system including a processor to initiate video playback on the player for each of the plurality of user devices, synchronize delivery, to each of the plurality of user devices, of the multimedia content and social media content generated on each of the plurality of user devices, and exchange playback control messages with the streaming application to direct synchronized transmissions of the multimedia content and social media content from the player to each of the plurality of user devices,
wherein the multimedia content and the social media content are delivered to each of the plurality of user devices at a same time, without any noticeable lag time during receipt of the multimedia content and the social media content by the plurality of user devices.

2. The communal media system of claim 1, wherein the synchronization system is configured to adjust simultaneous deliveries of the multimedia content and the social media content to the plurality of user devices, based on at least one of a priority associated with each layer of the multimedia content, timestamp receipts, and fragment identifier acknowledgements received from each of the plurality of user devices.

3. The communal media system of claim 1, further comprising a contact management system configured to manage invitations and notifications to user devices participating in the communal session.

4. The communal media system of claim 3, wherein the contact management system is configured to receive identifying information for each of the plurality of user devices, to send invitations and notifications to each of the plurality of user devices participating in the communal session, and to receive an acceptance or a rejection for an invitation sent to each of the plurality of user devices.

5. The communal media system of claim 1, wherein the integration system is configured to receive a first authentication indication for each of the plurality of user devices when the communal session is initiated and to receive a second authentication indication for each of the plurality of user devices at an appointed future time after an initiation period, wherein the communal session is scheduled to occur at the appointed future time.

6. The communal media system of claim 1, wherein the address is an internet protocol address, a device identifier, an email address, a telephone number or other information that uniquely identifies each of the plurality of user devices.

7. The communal media system of claim 1, wherein the synchronization system is configured to capture system configuration information from each of the plurality of user devices and determine if system configuration on each of the user devices meets a predetermined threshold.

8. The communal media system of claim 1, wherein the integration system is configured to request that each of the plurality of user devices activates one or more cameras on the user device, wherein when a camera on each of the user devices is activated, the integration system is configured to initiate a video chat session, such that the video chat session is initiated and overlaid on top of the video rendered by the streaming application.

9. The communal media system of claim 1, wherein the integration system is further configured to receive, from the streaming application, a source location for content selected by a host device of the plurality of user devices and to transmit the source location the player in the streaming application, wherein the player is a video player that is configured to transmit the content to each of the plurality of user devices.

10. The communal media system of claim 1, wherein the synchronization system is configured to initiate, via the player, video playback on each of the plurality of user devices and to synchronize simultaneous delivery of multimedia content transmitted from the player to each of the plurality of user devices, such that each of the plurality of user devices receives delivered content at a same time with no noticeable delivery lag, as though each user device is a single device in a same location.

11. The communal media system of claim 1, wherein the synchronization system is configured to synchronize simultaneous delivery, via the streaming application, of live a video captured from at least one camera on one of the user devices to other user devices not creating the video, such that each of the user devices receives delivered video at the same time it is being recorded with no noticeable delivery lag.

12. The communal media system of claim 1, wherein the synchronization system is configured to simultaneously transmit, via the streaming application, video chats, texts, emotive responses, and other social media content generated on one of the user devices to other user devices not creating the social media content, wherein the social media content is overlaid on the multimedia content.

13. The communal media system of claim 1, wherein the synchronization system is configured to adjust simultaneous deliveries of the multimedia content to the plurality of user devices based on at least one of video fragments and frames for differing video delivery formats, wherein the synchronization system synchronizes at least one of video fragments and frames delivered to the plurality of user devices according to a predetermined latency interval between the plurality of user devices.

14. The communal media system of claim 1, wherein one or more of the social media content, advertisement and recommendations is overlaid on delivered multimedia content and wherein the multimedia content includes video capture on at least one camera on one of the user devices.

15. A method for delivering multimedia content during a communal session at a communal media system commutatively coupled with a streaming application, comprising:
receiving a request to initiate the communal session from the streaming application, wherein the request is received by a communal session initiator provided within the streaming application, and the communal session initiator executes the communal media system within the streaming application;
retrieving contact information for a plurality of user devices selected to participate in the communal session from the streaming application;
retrieving an address for each of the plurality of user devices from the streaming application;
receiving a source location for multimedia content selected in the streaming application and sharing the source location with a player in the streaming application that is configured to transmit content to each of the plurality of user devices;
at an appointed time, initiating video playback on the player for each of the plurality of user devices;
synchronizing the multimedia content and social media content generated on each of the plurality of user devices during delivery of the multimedia content and the social media content to each of the plurality of user devices; and
exchanging playback control messages with the streaming application to direct synchronized transmissions of the multimedia content and social media content from the player to each of the plurality of user devices.

16. The method of claim 15, further comprising, before initiating video playback, requesting that each of the plurality of user devices starts a camera feed and receiving an indication from each of the plurality of user devices that one or more cameras in the user device is activated.

17. The method of claim 16, further comprising opening a video chat session for each of the plurality of user devices and displaying an opened video chat session on the streaming application.

18. The method of claim 15, wherein retrieving contact information further comprises sending a notification to each of the plurality of user devices and receiving an indication from the streaming application that each of the plurality of user devices is an authenticated device.

19. The method of claim 15, wherein retrieving contact information further comprises receiving an acceptance notification or a rejection notification from each of the plurality of user devices, wherein a user device providing the acceptance notification is enabled to participate in the communal session.

20. The method of claim 15, further comprising receiving an indication from the streaming application when the communal session ends, closing a video chat session executed on each of the plurality of user devices, and transferring control to the streaming application.

* * * * *